June 7, 1949. W. L. WEST 2,472,556
ROTARY HELICOPTER AND SUPPORT
Filed May 12, 1947 4 Sheets-Sheet 1

INVENTOR:
WILLIAM L. WEST.
BY Paul S Eaton
ATTORNEY

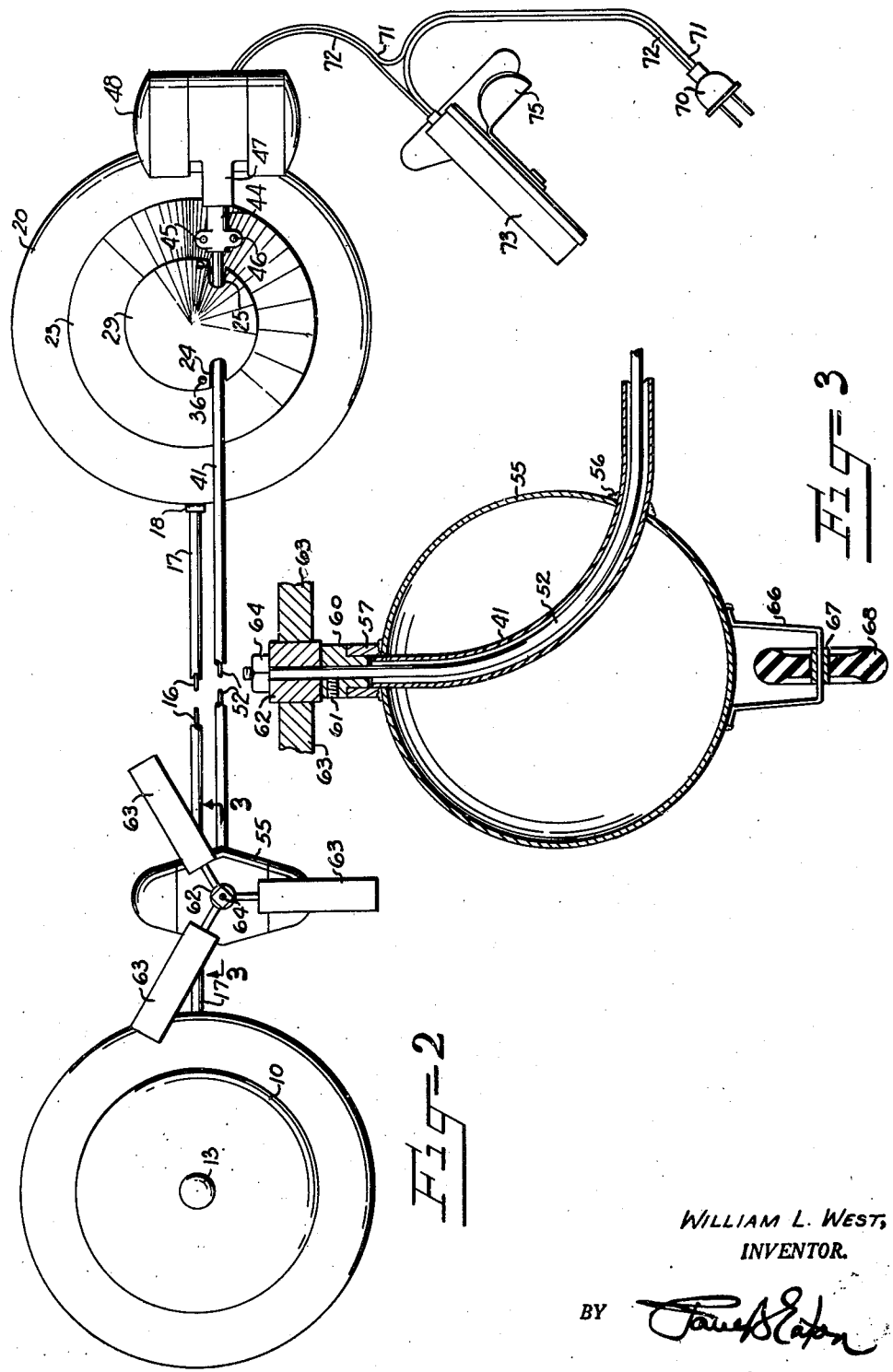

June 7, 1949. W. L. WEST 2,472,556
ROTARY HELICOPTER AND SUPPORT
Filed May 12, 1947 4 Sheets-Sheet 3
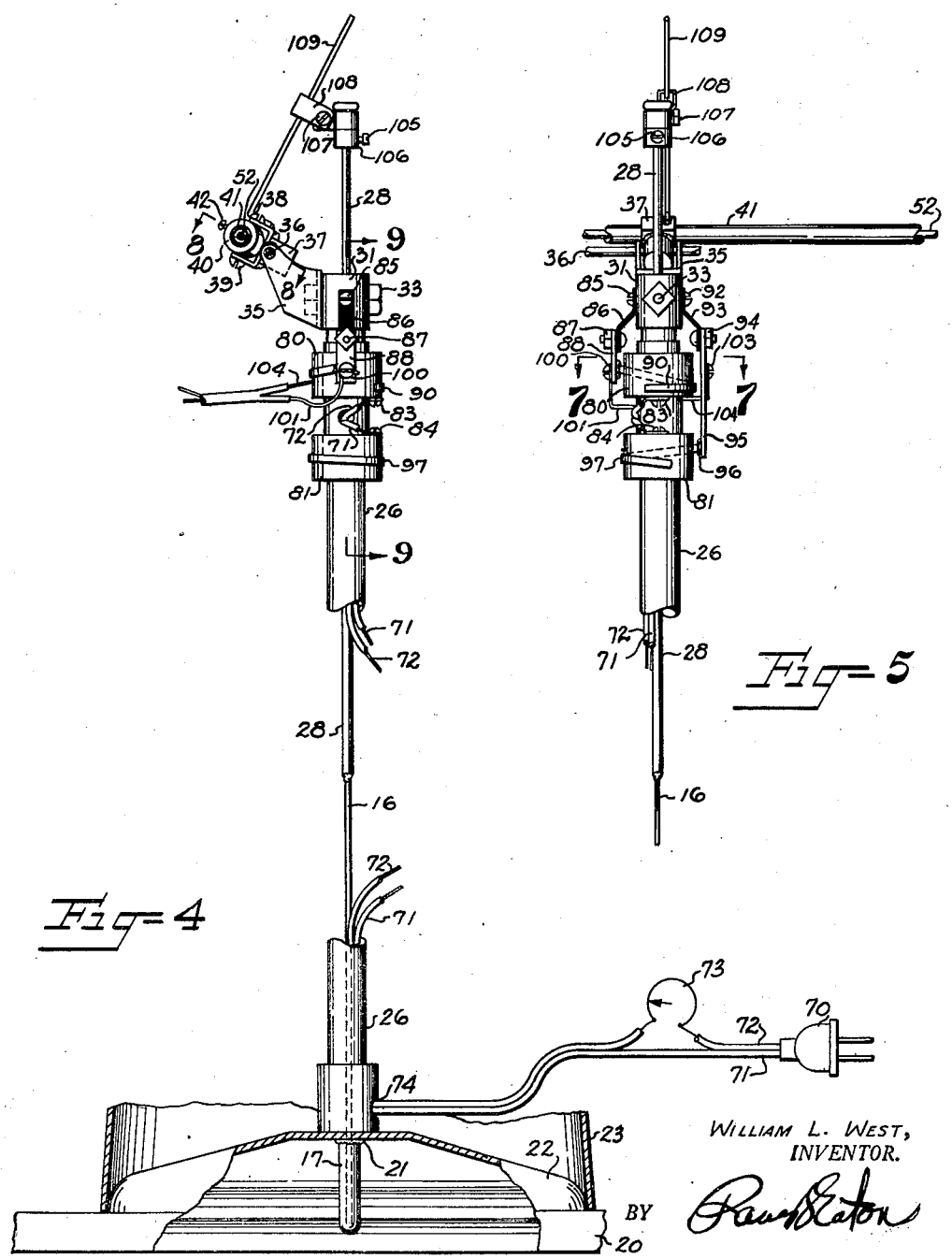
WILLIAM L. WEST,
INVENTOR.
BY
ATTORNEY.

June 7, 1949.  W. L. WEST  2,472,556
ROTARY HELICOPTER AND SUPPORT
Filed May 12, 1947  4 Sheets-Sheet 4
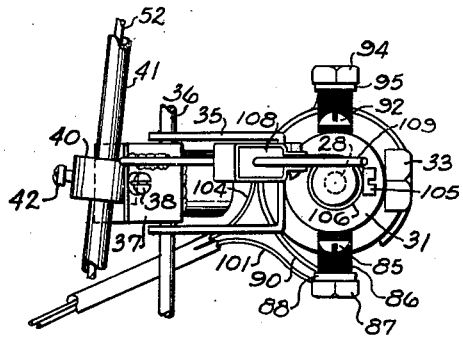
Fig-6
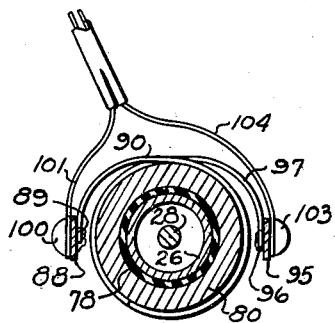
Fig-7
Fig-8
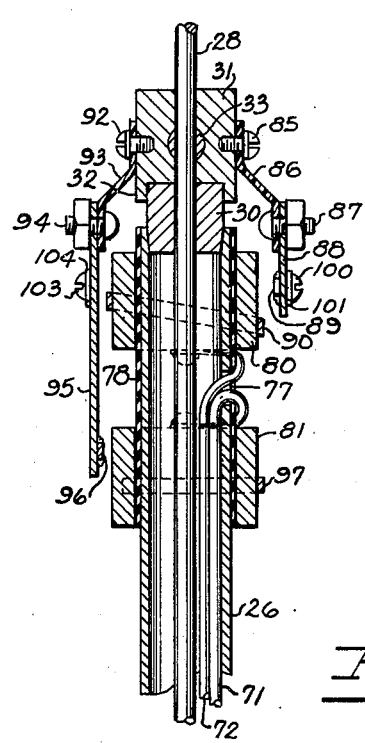
Fig-9
WILLIAM L. WEST,
INVENTOR.
BY *Paul Eaton*
ATTORNEY.

Patented June 7, 1949

2,472,556

UNITED STATES PATENT OFFICE 2,472,556

ROTARY HELICOPTER AND SUPPORT

William L. West, Belmont, N. C.

Application May 12, 1947, Serial No. 747,463

5 Claims. (Cl. 46—75)

This invention relates to a toy, wherein a toy helicopter is mounted on a counter-balanced structure, and electrical means are employed for causing the helicopter to travel in a circle and also control means are provided for not only regulating the revolutions per minute of the propeller of the helicopter but the angularity of the fuselage of the helicopter, or the angle of attack, can be controlled to cause the helicopter to travel in a clockwise or a counterclockwise direction as desired.

Some of the objects of the invention having been stated, other objects will appear as the description proceeds when taken in connection with the accompanying drawings, in which Figure 1 is an elevation, with parts broken away, showing the invention;

Figure 2 is a top plan view of Figure 1;

Figure 3 is a vertical sectional view through the helicopter and being taken along the line 3—3 in Figure 2;

Figure 4 is an elevation with parts broken away and omitting the housing or tower and showing the tube for supporting the helicopter broken away;

Figure 5 is an elevation looking from the right-hand side of Figure 4;

Figure 6 is a top plan view of the upper portion of Figure 4;

Figure 7 is a sectional plan view taken along the line 7—7 in Figure 5;

Figure 8 is a sectional view taken along the line 8—8 in Figure 4;

Figure 9 is a vertical sectional view taken along the line 9—9 in Figure 4.

Figure 1:
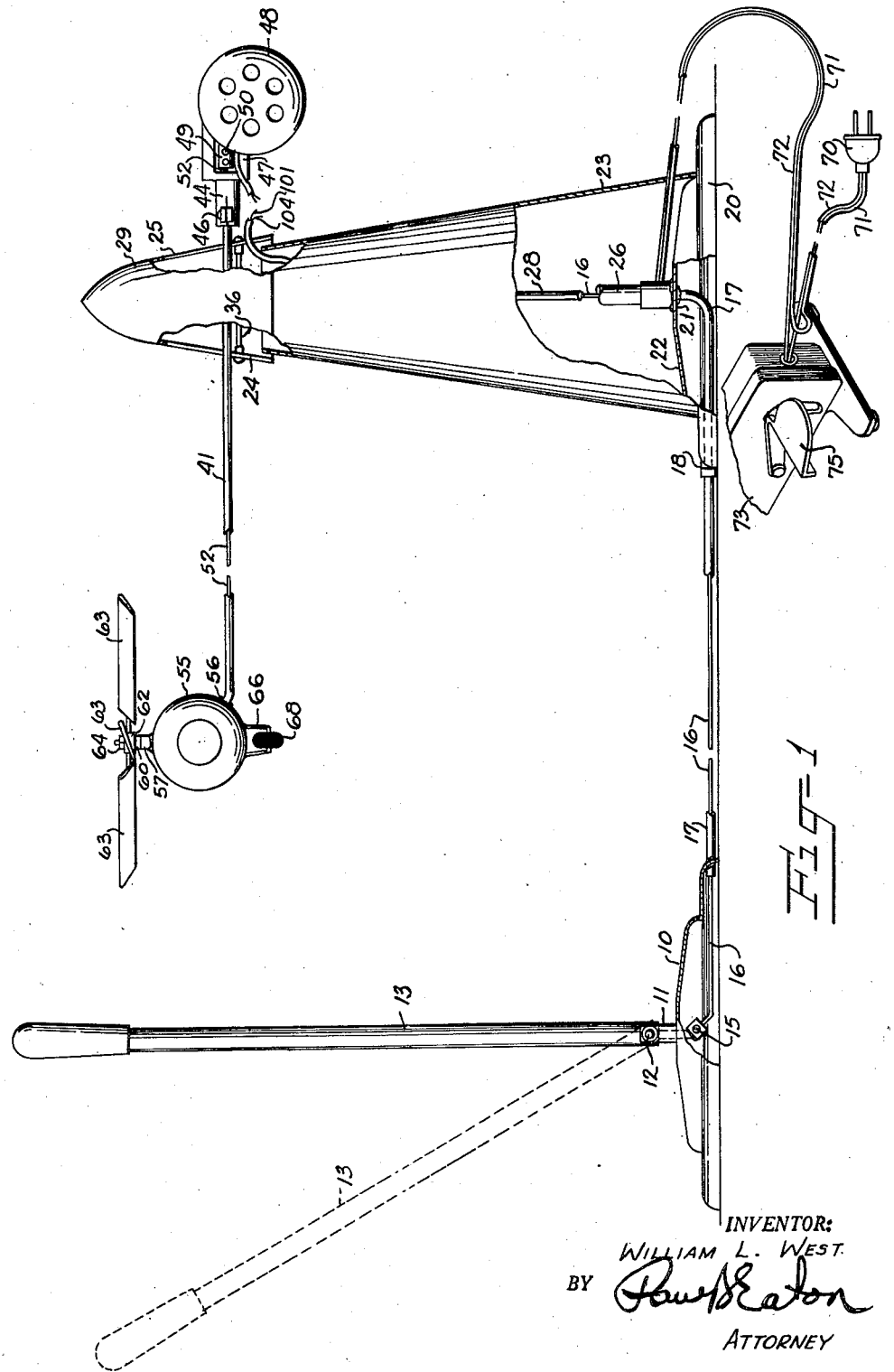

Referring more specifically to the drawings, the numeral 10 indicates a control base having rising upwardly therefrom a projection 11 in which is pivotally mounted as at 12 a control handle 13 having a downwardly projecting portion pivotally secured as at 15 to a flexible wire 16 which passes through a tube 17 which has one end welded to the base 10. The tube 17 is also welded as at 18 to tower base 20. This tube 17 has its other end welded as at 21 to a platelike member 22 mounted on base 20. Also mounted on base 20 is a tower or conically shaped housing 23 which has a cap 29 loosely encircling its upper end and slotted as at 24 and 25. To the upper surface of plate 22 is fixedly secured the lower end of a pipe 26.

The wire 16 extends upwardly in the pipe 26 and is welded to the lower end of a rod 28 which is slidably mounted in the pipe 26. The pipe 26 has mounted in the upper end thereof, by any suitable means such as a pressed fit, a plug 30 which is slidably penetrated by the shaft 28. Rotatably mounted on top of plug 30 is a bearing member 31 which has a peripheral flange 32 at its lower end, encircling the upper end of the plug 30. The bearing block 31 is penetrated by a bolt 33 which in turn has a vertically disposed hole therethrough which is slidably penetrated by the shaft 28.

The bolt 33 secured to the bearing 31 a U-shaped bracket 35 which is slidably penetrated at its free ends by a horizontally disposed shaft 36 which extends from each side of the bracket 35 and penetrates the cap 29. The exposed ends of the shaft 36 are bradded or peened to hold the same in the cap 29. The shaft 36 slidably penetrates a U-shaped member 37 confined within the bracket 35, which bracket 37 is slidably penetrated by screws 38 and 39 which are threadably imbedded in a sleeve 40 which is penetrated by a tube 41 which is adjusted in position in the sleeve 40 by means of a set screw 42.

The tube 41 has fixed on one end thereof a split sleeve 44 which is clamped on the end of tube 41 by means of suitable clamping screws 45 and 46. Sleeve 44 is integral with a motor support housing 47 having an electric motor 48 secured therein. The electric motor 48 has a motor shaft 49 to which is secured as at 50 by one end of a flexible wire 52 which extends through the tube 41 and the tube 41 penetrates a fuselage 55 of a toy helicopter and the tube is welded to the fuselage 55 as at 56.

The top central portion of the helicopter fuselage 55 has an upwardly projecting sleeve 57 welded thereto and the free end of tube 41 is fitted a tight fit into the lower portion of the tube or collar 57. Rotatably mounted in the collar 57 is a sleeve or collar 60 which is fixed to the wire 52 by means of a set screw 61.

The wire 52 also penetrates a hub 62 of the roller which has rotor blade 63 fixed thereon or integral therewith. The free end of wire 52 is threaded and has a nut 64 thereon which clamps the hub 62 against the bearing block or collar 60 and thus collar 60, hub 62 and rotors 63 all rotate as a unit.

The fuselage 55 has on its lower central portion a downwardly projecting U-shaped bracket 66 on which is mounted a hub portion 67 of a ground wheel 68.

In order to energize the electric motor 48, a male plug 70 is adapted to be plugged into a suitable source of electrical energy and has leading therefrom wires 71 and 72. One of these wires such as 72 has a rheostat 73 connected in series therewith. The rheostat is manipulated by a foot pedal 75.

The wires 71 and 72 penetrate a hole 74 in the lower end of the pipe 26 and these wires 71 and 72 extend upwardly inside the pipe 26 and pass out through a hole 77 in the pipe 26. The upper end of the pipe 26 has fixedly secured thereon, by a pressed fit, an insulating sleeve 78 and the hole 77 in the pipe 26 extends through the sleeve 78 so that the wires 71 and 72 can pass to the exterior of the sleeve 78.

Fixedly secured around the upper and lower ends of the insulating sleeve 78 are metallic collars 80 and 81. The wire 72 is secured as at 83 to collar 80 while wire 71 is secured as at 84 to collar 81. The block 31 has secured thereon by a screw 85 an angularly projecting insulating bracket 86 which has secured as at 87 a plate 88 and this has secured thereon as at 89 a leaf spring brush 90 which is adapted to partially encircle and press against the collar 80 at all times. The block 31 also has secured as at 92 an insulating bracket 93 which has secured as at 94 a metal plate 95 to which is secured, as at 96, a brush 97 which partially encircles and presses against the collar 81 at all times. The member 88 has secured thereto as at 100 a wire 101 which leads to the electric motor 48 and the member 95 which is a conducting member also has secured thereto as at 103 a wire 104 which likewise leads to the electric motor 48 for supplying energy thereto.

The shaft 28 projects upwardly through the block 31 and has fixed thereon by a set screw 105 a collar 106 which has fixedly secured thereto as at 107 a collar 108 having a hole therethrough which is slidably penetrated by an arm 109, the other end of the arm being fixedly secured to the collar 40 which is secured to the bracket 37.

Method of operation

The plug 70 connected to a suitable source of electrical energy, the pedal 75 will be depressed to make contact in the rheostat 73 to cause current to be conducted to the electric motor 48. This will rotate wire 52 and impart rotation to the blades 63 of the propeller. The further the pedal 75 is depressed, the greater will be the speed of rotation of the propeller on account of cutting down the resistance to the motor 48 which will thus increase the revolutions per minute of the motor 48. Since the toy helicopter is heavier than the motor 48 and since the tube 41 is balanced in the member 40, the revolutions per minute of the propeller will determine how high the helicopter rises from the floor.

The helicopter can be made to travel in a clockwise or counter-clockwise manner when looking down on Figure 2 by changing the angle of attack of the toy helicopter. By seizing handle 13 and moving it towards dotted line position in Figure 1, the shaft 28 will be raised and this will elevate the free end of lever 109 which will point the end of the fuselage nearest the observer in Figures 1 and 2 downwardly, then the direction of flight would be counter-clockwise in Figure 2. If the handle 13 is moved to the right in Figure 1, then this will lower shaft 28 and since lever 109 slides in cuff 108 this will lower the end of the fuselage 55 remote from the observer in Figures 1 and 2 and will cause the helicopter to travel in a circular path in a clockwise manner.

It is of course evident that the member 37 will pivot on the pivot 36 during such movements.

In the drawings and specification there has been set forth a preferred embodiment of the invention, and although specific terms are employed, they are used in a generic and descriptive sense only, and not for purposes of limitation, the scope of the invention being defined in the claims.

I claim:

1. A toy comprising a base member, a vertically disposed pipe extending upwardly from the base member, a tube connected to the lower end of the pipe and extending to a remote point from the lower end of the pipe, a second base member to which the other end of the tube is connected, a control lever mounted in the second base member, and pivoted a short distance above its lower end and having a flexible wire secured thereto, the flexible wire extending through the tube and upwardly into said pipe, said pipe having a shaft mounted therein for vertical movement and connected at its lower end to said flexible wire, a plug rotatably mounted in the upper end of the pipe and being slidably penetrated by said shaft, a pair of spaced collars mounted on the upper end of the pipe and being insulated from each other and from the pipe, a means for supplying an electric current to both of said collars, a pair of brushes mounted on said plug and adapted to contact said collars, a laterally projecting support mounted on said plug and having a bracket pivotally mounted therein, a tube mounted in the last-named bracket, the upper end of the shaft projecting a substantial distance above the upper surface of said plug and having a member pivotally secured thereon and provided with a hole and an arm slidably mounted in the hole in said pivoted member and having its other end secured to the tube mounted in said bracket for supporting said last-named tube, an electric motor mounted on one end of the last-named tube, conducting wires leading from said brushes to said electric motor, a toy helicopter having a propeller mounted on the other end of said last-named tube, a driving shaft extending through the last-named tube and having one end connected to the electric motor and having the other end connected to the propeller of said helicopter whereby movement of said lever will move said shaft vertically to rotate the second-named tube to thereby change the angle of attack of the helicopter.

2. In a toy airplane comprising a base, a control lever located remotely from said base and having a control member connected thereto and extending to the said base, a pipe rising upwardly from said base into which said control means project, a shaft mounted for vertical movement in said pipe and extending substantially beyond the upper end of the pipe, said pipe having a pair of spaced collars mounted thereon and insulated from each other and from the pipe, an electrical circuit leading to the two collars, a rotatable plug mounted in the upper end of said pipe and being slidably penetrated by said shaft, a pair of brushes mounted on said plug and adapted to engage the two collars, a laterally projecting bracket mounted on said plug, an oscillatable bracket mounted in the first-named bracket, a collar mounted in said second-named bracket, and a tube penetrating said collar and provided with a driving shaft therein, means for anchoring said tube in said collar, an arm secured to said second-named bracket and extending upwardly, a pivoted member on the upper end of said shaft and having a hole therethrough slidably penetrated by said arm, an electric motor mounted on one end of said tube and a pair of wires leading from the brushes to the electric motor, a toy helicopter secured on the other end of said tube and having a propeller disposed thereabove, means connecting said driving shaft at one end to the electric motor and its other end to said propeller, resistance means in said electrical circuit for controlling the revolutions per minute of said electric motor, upward and downward movement of said shaft in said pipe tending to oscillate said collar and the tube carried thereby to thereby vary the angle of attack of the propeller of the helicopter.

3. In a toy comprising a stand, a tube mounted intermediate its ends in said stand, the means for mounting the tube at the upper end of said stand permitting rotation of the tube and mounting means relative to the stand, an electric motor mounted on one end of the tube, a toy helicopter mounted on the other end of said tube, a driving shaft in said tube having one end connected to the electric motor and the other end connected to the propeller of the helicopter, remotely controlled means for oscillating said tube to vary the angle of attack of the helicopter and means for varying the revolutions per minute of the motor to thereby vary the speed of rotation of the propeller.

4. In a roundabout, an elongated pipe pivoted intermediate its ends on a vertically disposed support, a driving shaft disposed in said pipe, an electric motor mounted on one end of the pipe and connected to said driving shaft, a toy helicopter secured on the other end of the pipe and having a rotor disposed thereabove, a driving connection between the driving shaft and the rotor for imparting rotation thereto, means for conducting electrical current to said motor, and remotely controlled means for oscillating said pipe to thereby change the angle of attack of the toy helicopter and control its direction of flight.

5. In a roundabout comprising a vertically movable support, a pipe mounted intermediate its ends on the upper end of said support, a motor mounted on one end of the pipe, a toy helicopter having a rotor mounted on the other end of said pipe, a driving shaft disposed within said pipe and connected to said motor and to said rotor, remotely mounted means for tilting the support for the pipe to vary the angle of attack of the rotor of the helicopter to thereby cause it to fly either forward or backward.

WILLIAM L. WEST.

No references cited.